(12) United States Patent
Cao et al.

(10) Patent No.: US 9,893,487 B2
(45) Date of Patent: Feb. 13, 2018

(54) DEVICE AND METHOD FOR TUNING A RING RESONATOR USING SELF-HEATING STABILIZATION

(71) Applicant: RANOVUS INC., Ottawa (CA)

(72) Inventors: Bin Cao, Kanata (CA); Dylan Logan, Ottawa (CA); Douglas J. S. Beckett, Kanata (CA); Rong Chen, Kanata (CA); Andrew Peter Knights, Dundas (CA)

(73) Assignee: RANOVUS INC., Ottawa, Ontario (CA)

( * ) Notice: Subject to any disclaimer, the term of this patent is extended or adjusted under 35 U.S.C. 154(b) by 0 days.

(21) Appl. No.: 15/018,575

(22) Filed: Feb. 8, 2016

(65) Prior Publication Data

US 2017/0229837 A1    Aug. 10, 2017

(51) Int. Cl.
*H01S 3/102* (2006.01)
*H01S 3/083* (2006.01)

(52) U.S. Cl.
CPC ............ *H01S 3/1028* (2013.01); *H01S 3/083* (2013.01)

(58) Field of Classification Search
CPC ... H01S 3/1028; H01S 3/083; H04B 10/2507; H04B 10/275; H04B 10/2513; G02B 6/2934; G02B 6/29343; G02B 6/29394; G02B 6/29395
See application file for complete search history.

(56) References Cited

U.S. PATENT DOCUMENTS

| 9,081,135 | B1 | 7/2015 | Jones et al. | |
| 2010/0200733 | A1* | 8/2010 | McLaren | G02B 6/12007 250/214 C |
| 2015/0263190 | A1 | 9/2015 | Knights et al. | |

OTHER PUBLICATIONS

Ban et al., "Modeling of Self-Heating Effect for Depletion-Type Si Micro-Ring Modulator", Apr. 20-22, 2015, Optical Interconnects Conference, 134-135.*
Extended European Search Report dated Jun. 16, 2017, by EPO, re European Patent Appliction No. 17154643.5. 5 pages.
Arbabi, A., & Goddard, L. L. (2012). Dynamics of self-heating in microring resonators. IEEE Photonics Journal, 4(5), 1702-1711.

* cited by examiner

*Primary Examiner* — Joshua King
(74) *Attorney, Agent, or Firm* — Perry + Currier, Inc.

(57) ABSTRACT

A device and method for tuning a ring resonator using self-heating stabilization is provided. A light source is controlled to produce an optical signal, input to an optical ring resonator, at a power where self-heating shifts a resonance wavelength of the optical ring resonator by at least 10 picometers, the self-heating comprising absorption in the optical ring resonator of optical power from a received optical signal. Prior to using the optical ring resonator at least one of modulate and filter the optical signal at the optical ring resonator, a heater of the optical ring resonator is controlled to an operating temperature at which the resonance wavelength of the optical ring resonator is greater than a respective wavelength of the optical signal.

16 Claims, 7 Drawing Sheets

DEVICE AND METHOD FOR TUNING A RING RESONATOR USING SELF-HEATING STABILIZATION

FIELD

The specification relates generally to telecommunication devices, and specifically to a device and method for tuning a ring resonator using self-heating stabilization.

BACKGROUND

Resonance properties of ring resonators, including silicon-based ring resonators, are generally tuned to a resonance wavelength similar to a wavelength of a received laser wavelength, such that the ring can modulate and/or filter the received laser wavelength. Silicon-based ring resonators are especially susceptible to thermal fluctuations due to the relatively high thermo-optic coefficient of silicon and the resonant nature of the ring resonators. Any perturbation such as thermal variation can lead to drift of the resonance wavelength thus impacting modulator performance. Hence, for system performance stability, very tight heater control is generally required. Furthermore, self-heating can occur due to absorption of optical power in the ring resonator, which leads to further drift in the resonance frequency as a function of optical power. As such, light sources producing light that is modulated and/or filtered by a ring resonator are generally operated at powers where such self-heating does not occur, which leads to reductions in throughput power.

SUMMARY

The present specification provides devices which exploit self-heating in ring resonators to stabilize operation of the ring resonator. Specifically, a light source that produces an optical signal to be modulated and/or filtered by a ring resonator is controlled to produce the optical signal at a power where self-heating in the ring resonator occurs, and where the resonance wavelength is shifted by at least 10 picometers. Prior to the modulating and/or filtering of the optical signal at the optical ring resonator, a heater of the ring resonator is controlled to an operating temperature where the resonance wavelength of the ring resonator is greater than a respective wavelength of the optical signal. In other words, the wavelength of the optical signal is located on a blue side and/or a blue edge of a resonance curve of the optical ring resonator. The modulating and/or filtering hence occurs on the blue-side of the resonance, which is generally more stable than the red-side; indeed the red-side is quite unstable and the sweeping and/or decreasing the ring temperature from a higher temperature to an operating temperature avoids hysteresis effects caused by self-heating that occur when sweeping and/or increasing the ring temperature from a lower temperature to the operating temperature.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

An aspect of the specification provides a device comprising: a light source configured to produce an optical signal; an optical waveguide configured to receive and convey the optical signal from the light source; an optical ring resonator coupled to the optical waveguide, the optical ring resonator configured to: receive the optical signal from the optical waveguide; and, at least one of modulate and filter the optical signal on the optical waveguide; a heater positioned to heat the optical ring resonator; a voltage control device positioned to change a voltage across the optical ring resonator; and, a controller in communication with the light source, the heater and the voltage control device, the controller configured to: control the light source to produce the optical signal at a power where self-heating shifts a resonance wavelength of the optical ring resonator by at least 10 picometers, the self-heating comprising absorption in the optical ring resonator of optical power from a received optical signal; and, prior to at least one of modulating and filtering the optical signal at the optical ring resonator, control the heater to an operating temperature at which the resonance wavelength of the optical ring resonator is greater than a respective wavelength of the optical signal.

At the operating temperature, the respective wavelength of the optical signal can be on a blue edge of a resonance curve of the optical ring resonator.

A shift in the resonance wavelength of the optical ring resonator due to the self-heating can be in a range where a given level of resonance of the optical ring resonator is both accessible and independent of optical ring temperature adjustment direction.

The controller can be further configured to control the heater to the operating temperature by sweeping from a temperature higher than the operating temperature to the operating temperature.

At a given level of self-heating a peak in an extinction ratio of the optical ring resonator as a function of heater temperature can be outside of a hysteresis region, and the controller can be further configured to control the heater to the operating temperature from either a high-to-low temperature adjustment direction or a low-to-high temperature adjustment direction.

At a given level of self-heating a peak in an extinction ratio of the optical ring resonator as a function of heater temperature can be inside a hysteresis region, and the controller can be further configured to control the heater to the operating temperature by sweeping from a temperature higher than the operating temperature to the operating temperature.

A shifted resonance wavelength of the optical ring resonator due to the self-heating can be determined from one or more of: varying the power of the optical signal; varying the respective wavelength of the optical signal; varying the temperature of the optical ring resonator using the heater; and varying the voltage applied to the optical ring resonator using the voltage control device.

The light source can comprise one or more of a laser and a coherent light source.

The optical waveguide and the optical ring resonator can be formed from one or more of a photonic integrated circuit and a silicon photonic integrated circuit.

The controller can be further configured to at least one of modulate and filter the optical signal on the optical waveguide after controlling the heater to the operating temperature.

Another aspect of the specification provides a method comprising: at a device comprising: a light source configured to produce an optical signal; an optical waveguide configured to receive and convey the optical signal from the light source; an optical ring resonator coupled to the optical waveguide, the optical ring resonator configured to: receive the optical signal from the optical waveguide; and, at least one of modulate and filter the optical signal on the optical waveguide; a heater positioned to heat the optical ring resonator; a voltage control device positioned to change a voltage across the optical ring resonator; and, a controller in communication with the light source, the heater and the voltage control device, controlling, using the controller, the light source to produce the optical signal at a power where self-heating shifts a resonance wavelength of the optical ring resonator by at least 10 picometers, the self-heating comprising absorption in the optical ring resonator of optical power from a received optical signal; and, prior to at least one of modulating and filtering the optical signal at the optical ring resonator, controlling, using the controller, the heater to an operating temperature at which the resonance wavelength of the optical ring resonator is greater than a respective wavelength of the optical signal.

At the operating temperature, the respective wavelength of the optical signal can be on a blue edge of a resonance curve of the optical ring resonator.

A shift in the resonance wavelength of the optical ring resonator due to the self-heating can be in a range where a given level of resonance of the optical ring resonator is both accessible and independent of optical ring temperature adjustment direction.

The method can further comprise controlling, using the controller, the heater to the operating temperature by sweeping from a temperature higher than the operating temperature to the operating temperature.

At a given level of self-heating a peak in an extinction ratio of the optical ring resonator as a function of heater temperature can be outside of a hysteresis region, and the method can further comprise controlling, using the controller, the heater to the operating temperature from either a high-to-low temperature adjustment direction or a low-to-high temperature adjustment direction.

At a given level of self-heating a peak in an extinction ratio of the optical ring resonator as a function of heater temperature can be inside a hysteresis region, and the method can further comprise controlling, using the controller, the heater to the operating temperature by sweeping from a temperature higher than the operating temperature to the operating temperature.

A shifted resonance wavelength of the optical ring resonator due to the self-heating can be determined from one or more of: varying the power of the optical signal;

varying the respective wavelength of the optical signal; varying the temperature of the optical ring resonator using the heater; and varying the voltage applied to the optical ring resonator using the voltage control device.

The light source can comprise one or more of a laser and a coherent light source, and the optical waveguide and the optical ring resonator are formed from one or more of a photonic integrated circuit and a silicon photonic integrated circuit.

The method can further comprise at least one of: modulating and filtering the optical signal on the optical waveguide after controlling the heater to the operating temperature.

Another aspect of the specification provides a non-transitory computer-readable medium storing a computer program, wherein execution of the computer program is for: at a device comprising: a light source configured to produce an optical signal; an optical waveguide configured to receive and convey the optical signal from the light source; an optical ring resonator coupled to the optical waveguide, the optical ring resonator configured to: receive the optical signal from the optical waveguide; and, at least one of modulate and filter the optical signal on the optical waveguide; a heater positioned to heat the optical ring resonator; a voltage control device positioned to change a voltage across the optical ring resonator; and, a controller in communication with the light source, the heater and the voltage control device, controlling, using the controller, the light source to produce the optical signal at a power where self-heating shifts a resonance wavelength of the optical ring resonator by at least 10 picometers, the self-heating comprising absorption in the optical ring resonator of optical power from a received optical signal; and, prior to at least one of modulating and filtering the optical signal at the optical ring resonator, controlling, using the controller, the heater to an operating temperature at which the resonance wavelength of the optical ring resonator is greater than a respective wavelength of the optical signal.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
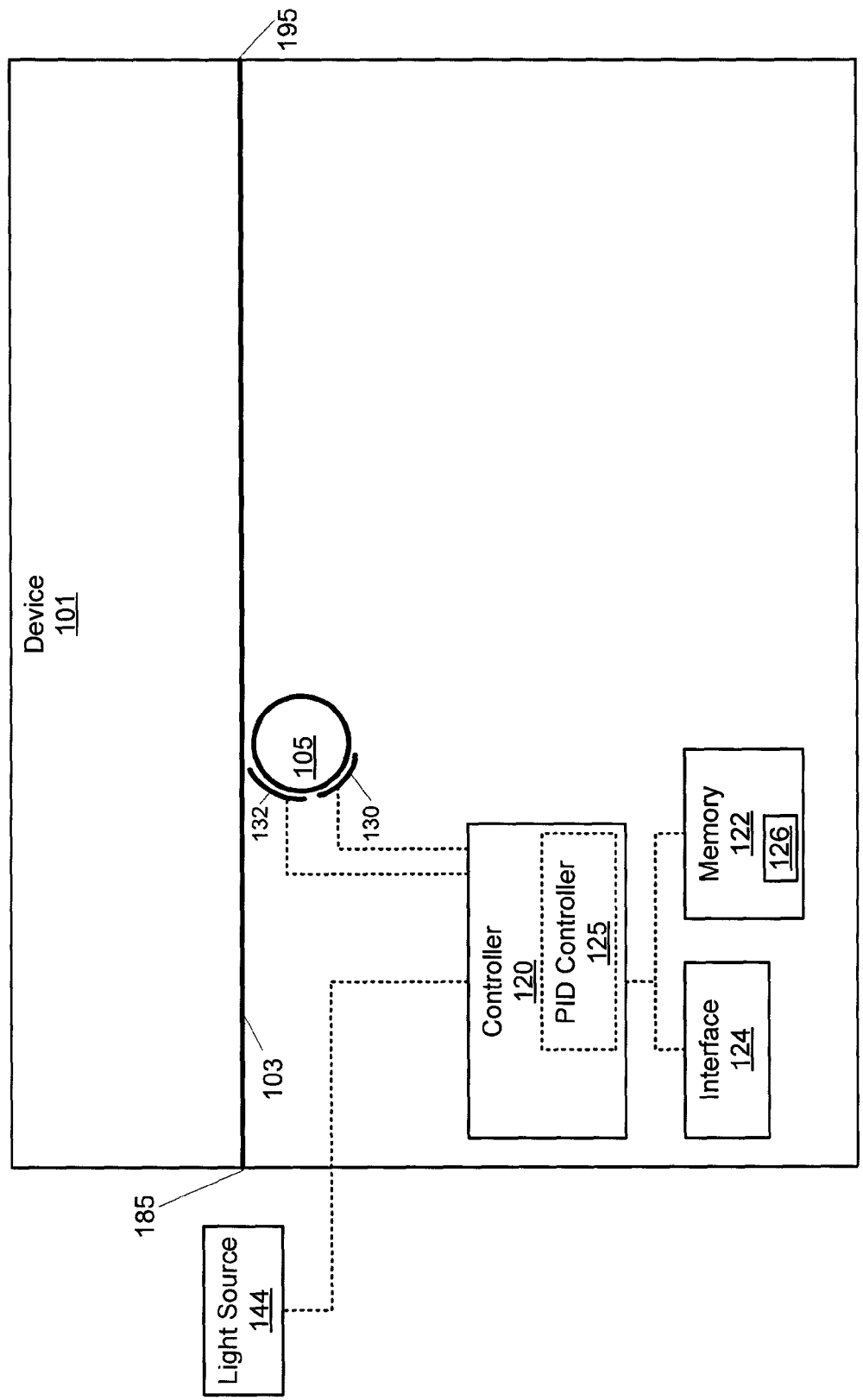
FIG. 1 depicts a schematic diagram of a device for tuning a ring resonator using self-heating stabilization, according to non-limiting implementations.

FIG. 1 depicts a device 101 comprising: a light source 144 configured to produce an optical signal; an optical waveguide 103 configured to receive and convey the optical signal from light source 144; an optical ring resonator 105 coupled to optical waveguide 103, optical ring resonator 105 configured to: receive the optical signal from optical waveguide 103; and, at least one of modulate and filter the optical signal on optical waveguide 103; a heater 130 positioned to heat optical ring resonator 105; a voltage control device 132 positioned to change a voltage across optical ring resonator 105; and, a controller 120 in communication with light source 144, heater 130 and voltage control device 132, controller 120 configured to: control light source 144 to produce the optical signal at a power where self-heating shifts a resonance wavelength of optical ring resonator 105 by at least 10 picometers, the self-heating comprising absorption in optical ring resonator 105 of optical power from a received optical signal; and, prior to at least one of modulating and filtering the optical signal at optical ring resonator 105, control heater 130 to an operating temperature at which the resonance wavelength of optical ring resonator 105 is greater than a respective wavelength of the optical signal. Hence, tuning as described herein can include, but is not limited to, at least one of modulating and filtering the optical signal at optical ring resonator 105. In some implementations, heater 130 is controlled to sweep from a temperature higher than operating temperature to the operating temperature, such that the temperature of heater 130 is decreased.

For clarity, in FIG. 1 and throughout the present specification, solid lines connecting components depict links and/or optical waveguides (interchangeably referred to as optical busses) that include flow of optical signals there between, while dashed and/or stippled lines connecting components depict links that include flow electrical data and/or electrical signals there between.

As depicted, device 101 further comprises a memory 122 and an interface 124 each interconnected with controller 120. In particular, memory 122 stores an application 126, which, when processed by controller 120, enables controller to control light source 144, heater 130 and voltage control device 132. Furthermore, as depicted controller 120 further comprises an optional proportional-integral-derivative (PID) controller 125; as such, in some implementations controller 120 can implement feedback loops using PID controller 125, for example to control heater 130 to a given temperature (and/or the operating temperature) and/or light source to a given optical power, however other types of controllers are within the scope of present implementations.

Heater 130 is generally configured to heat optical ring resonator 105, under control of controller 120, to control a resonance wavelength of optical ring resonator 105, for example to a resonance wavelength that is similar to a wavelength of the optical signal from light source 144. Controller 120 is further configured to control voltage control device 132 to modulate the optical signal. For example, while not depicted, controller 120 can comprise a modulation voltage driver (including, but not limited to a non-linear driver device) for external modulation of voltage control device 132 based, for example, on input received from interface 124. Hence, a modulated optical signal produced by optical ring resonator 105 has data encoded therein, and can be conveyed through an optical telecommunication network. Such data can include, but is not limited to, voice, audio, video, images, web data, browser data, and the like.

Voltage control device 132 can include, one or more of a PN-diode, a capacitor and the like; when voltage control device 132 comprises a PN-diode, the PN-diode can be driven in a reverse-bias mode and/or depletion mode using a non-linear driver device and/or a linear driver device.

Both heater 130 and voltage control device 132 are appreciated to be depicted schematically; for example, while both heater 130 and voltage control device 132 are depicted as being around a portion of an outside of optical ring resonator 105, in practise, heater 130 and/or voltage control device 132 can be located inside optical ring resonator 105 and/or in one or more planes adjacent to a depicted plane of optical ring resonator 105. For example, voltage control device 132 can comprise electrodes "above" and "below" optical ring resonator 105 (e.g. out of and into the page of FIG. 1), which are controlled by controller 120. When voltage control device 132 comprises a PN-diode, a junction of the PN-diode can be at ring 105.

Furthermore, in general, a resonance and/or reference frequency of an optical ring resonator can be coarsely controlled by controlling a circumference and/or a refractive index profile of an optical ring resonator (e.g. during fabrication thereof) by controlling the temperature of the optical ring resonator. As such, optical ring resonator 105 is generally coupled to optical waveguide 103, and heater 130 can be used to coarsely control the refractive index and therefore a reference resonance frequency of optical ring resonator 105, while voltage control device 132 is used to induce changes and/or small changes in a refractive index of optical ring resonator 105 to modulate the reference resonance frequency which in turn causes optical signals on optical waveguide 103 to be modulated.

As depicted, device 101 further comprises an optical input 185 to optical waveguide 103 configured to receive optical signals from light source 144 and an optical output 195 from optical waveguide 103. For example, optical input 185 can comprise one or more of an optical coupler, a PIC (photonic integrated circuit) facet and the like.

Light source 144 can comprise one or more of a laser and a coherent light source including, but not limited to, a distributed Bragg reflector laser, an external cavity laser and the like, configured to output optical signals (e.g. light) of a plurality of different frequencies and/or wavelengths, for example with a constant spacing, into optical waveguide 103; optical ring optical ring resonator 105 can hence be configured to resonate at a given frequency and/or given wavelength, of the plurality of different frequencies and/or wavelengths, such that an optical signal of given frequency and/or given wavelength is modulated by optical ring resonator 105 to produce a modulated optical signal output at optical output 195. While not depicted, device 101 can comprise a plurality of optical ring filters, similar to optical ring resonator 105, each of the plurality of optical ring filters configured to modulate a different given frequency and/or given wavelength of light from light source 144.

In general, the modulated optical signal (and/or plurality of modulated optical signals) is conveyed out of device 101 at optical output 195, for example to a fiber optic, which in turn conveys the modulated optical signal through an optical telecommunication network to a receiver, where the optical modulated optical signal is received and demodulated to retrieve data encoded therein. However, alternatively, optical ring resonator 105 filters an optical signal from light source 144 and the filtered signal is conveyed to optical output 195 without modulation. Such filtering can include, but is not limited to, tuning the optical signal to a given optical power as determined in feedback loop using, for example, an optical tap and the like.

In some implementations, device 101 can generally comprise a transmitter in an optical telecommunications system configured to generate and transmit a modulated optical signal at a given optical frequency (and a given data rate), the modulated optical signal having data encoded therein. As such, the given frequency optical frequency can comprise a given carrier optical frequency including, but not limited to, an optical frequency used in optical telecommunications in a range of about 184.5-238 THz; however other optical frequencies, and associated wavelengths, are within the scope of present implementations.

While not depicted, device 101 can be further configured to optically interface with an optical fiber (e.g. at optical output 195), and device 101 can hence transmit the modulated optical signal through the optical fiber, which can be hundreds of kilometers long (or more). Device 101 can hence comprise a modulating optical signal generator including, but not limited to, one or more lasers, including light source 144 which can be internal or external (as depicted) to device 101, one more light emitting diodes (LEDs), and the like, as well as one or more interfaces (such as interface 124) to data generating devices, including, but not limited to, servers, personal computers, laptops, mobile devices and the like, and the like.

It should be emphasized, however, that the structure of device 101 in FIG. 1 is purely an example, and contemplates a device that can be used for optical data communications. In particular, at least optical waveguide 103 and optical ring resonator 105 can be formed from a photonic integrated circuit (PIC); indeed, any components of device 101 that convey and/or interact with optical signals can be formed from a PIC. In particular non-limiting implementations, components of device 101 that convey and/or interact with optical signals can be formed from a silicon based PIC, however other materials are within the scope of present implementations.

Controller 120 can comprise a processor and/or a plurality of processors, including but not limited to one or more central processors (CPUs) and/or one or more processing units; either way, controller 120 comprises a hardware element and/or a hardware processor. Indeed, in some implementations, controller 120 can comprise an ASIC (application-specific integrated circuit) and/or an FPGA (field-programmable gate array) specifically configured to implement the functionality of controller 120. Hence, controller 120 is not necessarily a generic computing device and/or a generic processor and/or a generic component of computing controller 120, but a device specifically configured to implement specific functionality; such specific functionality includes controlling optical ring resonator 105 in a feedback loop to a given insertion loss as described in further detail below. For example, controller 120 can specifically comprise an engine configured to control ring in a feedback loop to a given insertion loss.

Memory 122 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of controller 120 and/or device 101 as described herein are typically maintained, persistently, in memory 122 and used by controller 120 which makes appropriate utilization of volatile storage during the execution of such programming instructions. Those skilled in the art recognize that memory 122 is an example of computer readable media that can store programming instructions executable on controller 120. Furthermore, memory 122 is also an example of a memory unit and/or memory module and/or a non-volatile memory.

In particular, memory 122 stores application 126 that when processed by controller 120 enables controller to: control light source 144 to produce the optical signal at a power where self-heating shifts a resonance wavelength of optical ring resonator 105 by at least 10 picometers, the self-heating comprising absorption in optical ring resonator 105 of optical power from a received optical signal; and, prior to at least one of modulating and filtering the optical signal at optical ring resonator 105, control heater 130 to an operating temperature at which the resonance wavelength of optical ring resonator 105 is greater than a respective wavelength of the optical signal, and more specifically, the respective wavelength of the optical signal is on a blue edge of a resonance curve of the optical ring resonator 105.

Interface 124 can comprise any wired and/or wireless interface configured to receive data used to modulate optical signals. As such, interface 124 is configured to correspond with communication architecture that is used to implement one or more communication links used to receive data, including but not limited to any suitable combination of, cables, serial cables, USB (universal serial bus) cables, and wireless links (including, but not limited to, WLAN (wireless local area network) links, WiFi links, WiMax links, cell-phone links, Bluetooth™ links, NFC (near field communication) links, packet based links, the Internet, analog networks, access points, and the like, and/or a combination). However, interface 124 is generally non-limiting and any interface used in optical telecommunication devices and/or optical telecommunication transmitters is within the scope of present implementations.

PID controller 125 generally calculates an "error value" as the difference between a measured process variable and a desired setpoint, and attempts to minimize the error over time by adjustment of a control variable, such as power supplied to heater 130, to a new value determined by a weighted sum. However, other types of controllers and/or control mechanisms (and/or feedback loops) are within the scope of present implementations.

While not depicted device 101 can further comprise one or more optical taps that diverts a fraction of the light from optical waveguide 103 and/or optical ring resonator 105 to a photodiode to sample an optical signal thereupon such that a power of an optical signal at optical waveguide 103 and/or optical ring resonator 105 can be monitored; indeed, optical taps on optical waveguide 103 can be located before and/or after optical ring resonator 105: optical taps before optical ring resonator 105 (e.g. between optical input 185 and optical ring resonator 105) can monitor an unmodulated optical signal, optical taps after optical ring resonator 105 (e.g. between optical output 195 and optical ring resonator 105) can monitor a modulated optical signal; an optical tap at optical ring resonator 105 can also measure the modulated optical signal. Such optical taps can include, but are not limited to, fiber taps, beam splitters, bends in optical waveguide 103, as well as respective photodiodes arranged so that optical signals (e.g. light) from an optical tap illuminate a photodiode to produce an electrical signal which can be conveyed to controller 120 for processing. Such optical taps can be incorporated into a PIC structure of device 101.

In any event, as the optical signal on optical waveguide 103 couples to optical ring resonator 105, photon absorption occurs in optical ring resonator 105 thus causing self-heating: e.g. heating that is due to absorption in optical ring resonator 105 of optical power from a received optical signal and not due to heater 130. In other words, a temperature change of optical ring resonator 105 is related to an incident optical power strength and a self-heating build up factor that occurs in addition to any heating due to heater 130. The self-heating build up factor has a profile similar to a ring modulator transfer function with a maximum heating build up factor at a maximum resonance. Because of these characteristics, ring modulator behavior will exhibit very differently at either side of the ring resonance slopes. At the red-side (e.g. at wavelengths longer than a resonance wavelength) of a ring modulator slope, self-heating provides more heating energy when optical ring resonator 105 is modulated towards a resonance wavelength, which leads to very unstable operation conditions. At a blue-side (e.g. at wavelengths shorter than a resonance wavelength) of the ring modulator slope, the self-heating can provide constructive feedback to balance the temperature change at optical ring resonator 105 during modulation.

Figure 2:
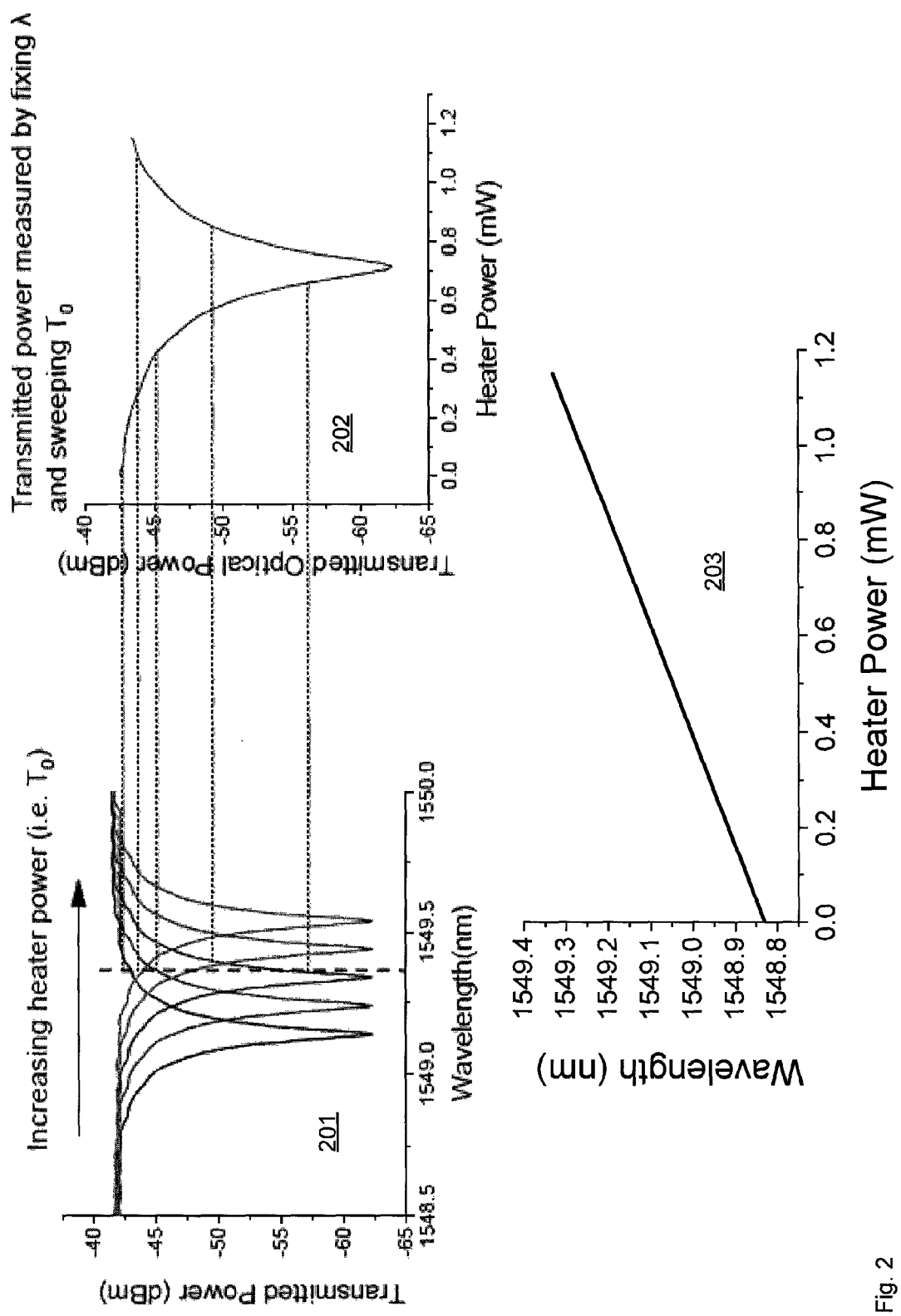
FIG. 2 depicts behaviour of a ring resonator in the absence of self-heating, according to non-limiting implementations.
Figure 3:
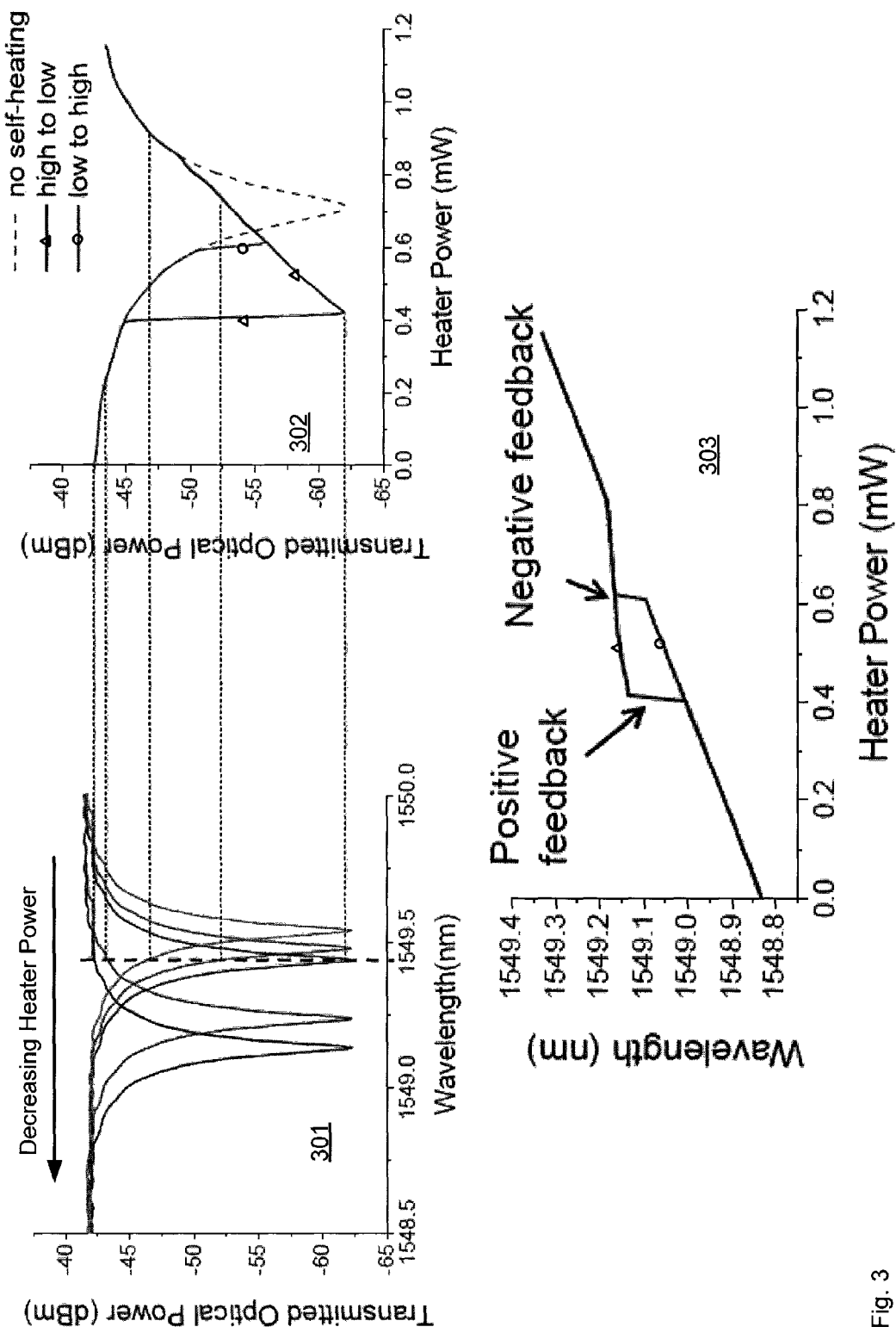
FIG. 3 depicts behaviour of a ring resonator in the presence of self-heating, as a heater temperature is increased and decreased, according to non-limiting implementations.

These concepts are depicted in FIGS. 2 and 3. For example, attention is first directed to FIG. 2 which depicts graphs 201, 202, 203 that show behaviour of a ring resonator, such as ring 105, in the absence of self-heating, as heater power increases. In particular, graph 201 depicts a plurality of curves representing transmitted optical power of a ring resonator as a function of wavelength as heater power increases, as well as a position of an example input wavelength at about 1549.35 nm, indicated by the stippled line. The input wavelength comprises a wavelength of an optical signal on an optical bus, such as optical bus 103, being modulated and/or filtered by the ring. In graph 201, the resonance position of the ring shifts towards the red as heater power increases; the shift is indicated by a shift in the minimum of each curve. Graph 202 depicts transmitted power at the input wavelength as a function of heater power, and as the heater power increases; in particular, the lines between graphs 201, 202 indicate the values of the transmitted power at the input wavelength on graph 201 and the corresponding heater power on graph 202. As clearly seen in graph 202, transmitted power at the input wavelength as a function of heater power is about symmetric about a heater power corresponding to where a resonance wavelength of the ring is about at the input wavelength. Furthermore, graph 203 depicts the resonance wavelength (e.g. the minima of graph 201) of the ring as a function of heater power; graph 203 is clearly linear.

Attention is next directed to FIG. 3, which depicts three graphs 301, 302, 303 that show behaviour of a ring resonator, such as ring 105, in the presence of self-heating. Each of graphs 301, 302, 303 are respectively similar to graphs 201, 202, 203, however in graphs 301, 302, 303, power of the optical signal at the input wavelength (indicated on graph 301 by the stippled line) is a power that causes self-heating in the ring. Graph 302 also shows the curve from graph 202 in stippled lines for comparison. Graph 301 depicts resonance curves of ring 105 as heater power decreases, as well as input wavelength at about 1549.35 nm (i.e. at the vertical stippled line). Graph 302 depicts transmitted optical power at the input wavelength as a function of heater power (and hence heater temperature), for both of when the heater power is controlled to decrease from high to low (as in graph 301), and increase from low to high. In particular, the portion of the curve labelled with a triangle corresponds to heater power/temperature decreasing, while the portion of the curve labelled with a circle corresponds to heater power/temperature increasing. Where there is no label, the curves are coincident.

As clearly seen in graphs 301, 302, as heater power decreases from a high temperature to a low temperature, the resonance of ring 105 changes suddenly as self-heating causes the physical and/or optical properties of the ring to change in addition to the physical and/or optical properties that occur due to heating of heater 130; hence, there is discontinuity in each of graphs 302, 303.

Furthermore, as clearly seen in graph 302, as the heater power increases from a low temperature to a high temperature, the resonance of ring 105 again changes suddenly as self-heating causes the physical and/or optical properties of the ring to change in addition to the physical and/or optical properties that occur due to heating of heater 130. However, position of the sudden change is different from when the heater temperature decreases, meaning there is hysteresis in the behaviour of ring 105. Indeed, for a decreasing heater power/temperature, a region where the self-heating dominates the transmitted optical power is wider than when the heater power/temperature increases. The lower temperature side of each of these regions is generally unstable (i.e. there are large changes in transmitted optical power that occur in response to small temperature changes).

Furthermore, from comparing graph 301, 302, it is appreciated that when the input wavelength of the optical signal is on a blue-side and/or a blue-edge of a resonance curve of ring 105, the input wavelength of the optical signal is generally located away from the unstable region. For example, as depicted the input wavelength is coincident with the peak of a resonance curve of ring 105 that is at the unstable region; small changes in temperature (e.g. a small decrease in temperature) will cause the transmitted optical power to be unstable.

Hence operation of ring 105 can generally controlled such that: a. the resonance wavelength of optical ring resonator 105 is greater than a respective wavelength of the optical signal, to ensure that the respective wavelength of the optical signal is on a blue-edge of a resonance curve of optical ring resonator 105; and, optionally, b. the region in which self-heating occurs is maximized, for example by decreasing the heater temperature to an operating temperature.

The effects of self-heating are further depicted in graph 303 for both conditions of increasing (low to high) and decreasing (high to low) the heater power/temperature to show hysteresis of a resonance wavelength of ring 105 as a function of wavelength; hence, for each condition of increasing and decreasing heater power a discontinuity again occurs.

When the heater power decreases, the resonance wavelength of ring 105 moves towards the input wavelength, and the self-heating in ring 105 acts to compensate and maintain the position on the resonance curve; in other words, in the region labeled "negative feedback", a slope of the curve is less than a slope of the curve in other regions. For example, the resonance wavelength (i.e. the wavelength at which a minimum occurs in each of the resonance curves in graph 301) remains about the same for a range of heater powers. As the heater power decreases further, the shift in resonance position acts to reduce the self-heating, leading to a sudden reduction in ring temperature, which causes a discontinuity in the graphs 302 and 303; this region is labeled "positive feedback" in graph 303.

Again with reference to graph 303, when heater power increases, the resonance position at which the discontinuity occurs changes, which narrows the region of negative feedback. Hence, range of a region of negative feedback can depend on the direction of the sweep in heater power and/or temperature to come to an operating temperature.

Figure 4:
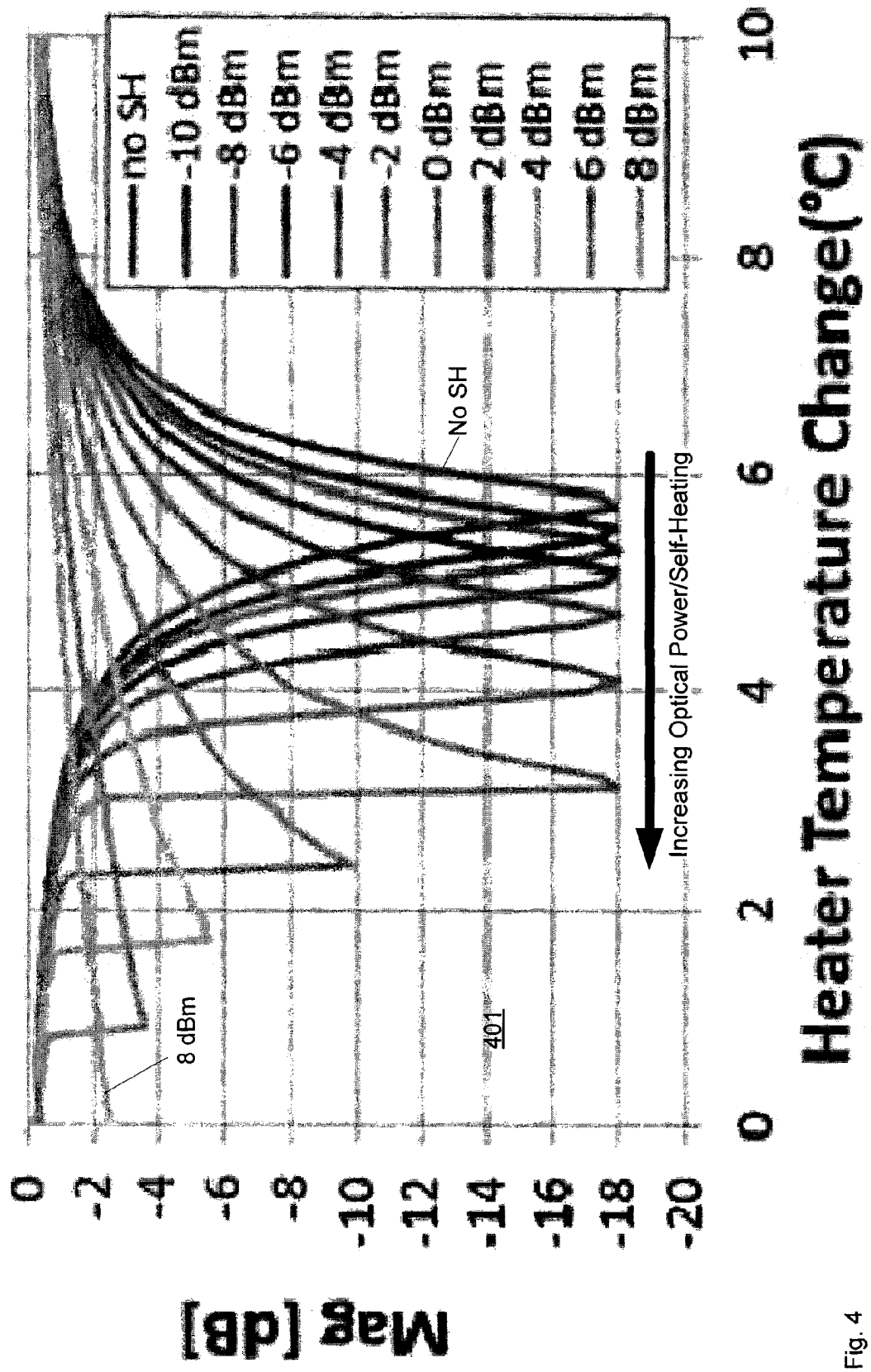
FIG. 4 depicts transmission profiles of ring resonator as a function of heater temperature for optical input signals of increasing optical power as the heater temperature decreases, according to non-limiting implementations.

A further non-limiting example of the effect of self-heating on an optical ring resonator, for example ring 105, is now described with reference to FIG. 4, which shows the transmitted power of an optical ring resonator as a function of a change in heater temperature, as the heater power is decreasing, for different optical input signals (of a fixed input wavelength) of increasing optical power. Each of the curves in FIG. 4 is similar to graph 302, however for different self-heating conditions. Indeed, the self-heating effect increases for each curve in graph 401 from right to left; in particular in the right-most curve (labelled "No SH") the optical power of the optical input signal is below a self-heating limit (and hence is similar to graph 302), and in the left-most curve the optical input signal has 8 dBm of optical power; in each successive curve from right to left the optical power of the optical input signal increases in 2 dBm steps as indicated by the legend. In particular the shift in the resonance wavelength between the No SH curve of graph 401 and the next curve at −10 dBm self-heating is about 10 picometers.

It is further assumed in FIG. 4 that an input wavelength is constant. Hence, as in FIG. 3, as the heater temperature decreases, and hence as the ring temperature decreases, and as the resonance wavelength of the ring approaches the input wavelength, the heat absorbed in the ring resonator increases, causing the resonance wavelength to shift to higher values, as indicated in the shift of the minimum of each successive curve in graph 401. In other words, the resonance wavelength increases (as indicated by the leftward shift in graph 401) until a thermal equilibrium is reached with the added heat due to self-heating. As the amount of self-heating is increased, the resonance of the ring becomes unstable, as indicated by the abrupt changes and/or asymmetry in the curves of graph 401 where self-heating occurs; indeed, the discontinuity becomes more abrupt in the curves as the self-heating effect increases (i.e. as the resonance wavelength approaches an input wavelength). In this unstable state, as the shifted ring resonance wavelength approaches the input wavelength, or vice versa, fluctuations and/or noise on the optical input power or ring temperature can cause the ring to snap back to its "no SH" position.

Hence, as is apparent from FIGS. 3 and 4, when no self-heating occurs, the resonance shape measured by a wavelength sweep is generally symmetric about the minimum. However, as the optical power of the optical input signal increases, and hence self-heating increases, several effects occur: the resonance wavelength of optical ring resonator 105 increases, as represented by shift in the minimum of each of the curves of each of graphs 301, 401, and the red-side of the transmission vs. heater temperature curve becomes unstable, where alignment to the red-side (i.e. at wavelengths greater than the resonance wavelength) is undesirably prevented by the afore-described positive feedback. Furthermore, as further described below in FIGS. 6 and 7, hysteresis occurs when increasing and decreasing heater power, and operating device 101 by first decreasing heater power to an operating temperature (rather than increasing heater power) can ensure that device 101 is operating in the negative feedback region. Specifically, as further described below with respect to FIGS. 6, 7, the region where negative feedback occurs will change depending on whether heater power is increased or decreased. For example, when heater power is decreased, the negative feedback region widens. Hence, device 101 is operated such that the input wavelength is on a blue-side of the resonance wavelength and/or at the flat slope portion of graph 303.

In other words, device 101 is generally operated to ensure that a wavelength of an optical signal being modulated and/or tuned by optical ring resonator 105 is less than a resonance wavelength of the optical ring resonator 105 such that the wavelength of the optical signal is located on the blue-side slope of a transfer function of ring 105 and/or in an area where self-heating occurs with negative feedback and/or in a negative feedback region of a wavelength vs heater power curve of ring 105. Hence, during operation of device 101, where there is more self-heating causing a red-shift and/or red-drift in the resonance wavelength, heater 130 will tune to lower temperature to keep aligning the resonance wavelength towards input optical signal wavelength. So the modulation will not operate at the flat slope of graph 303.

In particular, as will be described further below, present implementations include deliberately operating light source 144 and optical ring resonator 105 under conditions where the shift in resonance wavelength due to self-heating is at least 10 picometers, for example as occurs at least between the "no SH" curve in FIG. 4 and the −10 dBm curve in FIG. 4, and the input wavelength being modulated and/or filtered by ring 105 is on a blue-side of a resonance frequency of ring 105 when self-heating occurs.

Furthermore, modulation and/or filtering of the optical signal on the blue-side and in the negative feedback region of ring 105, provides stability to the modulation and/or filtering of the optical signal because, as external temperature changes, the resonance wavelength of optical ring resonator 105 becomes less susceptible to fluctuations in external temperature.

Figure 5:
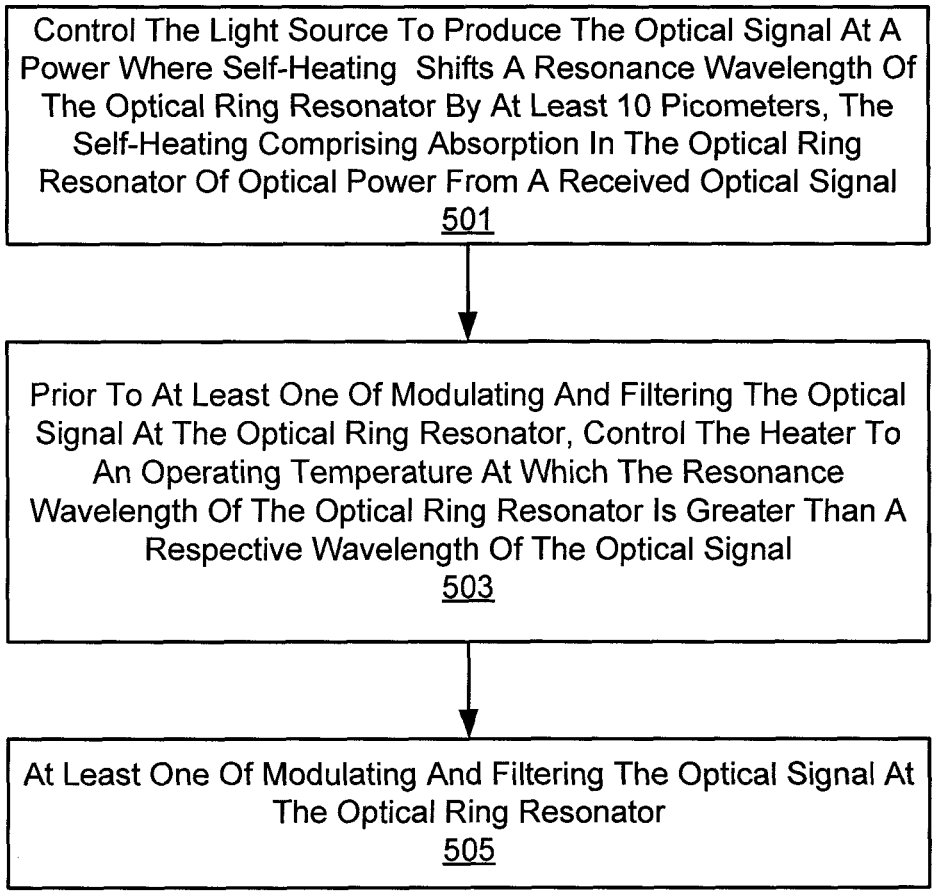
FIG. 5 depicts a schematic block diagram of a flowchart of a method for tuning a ring resonator using self-heating stabilization, according to non-limiting implementations.

Attention is now directed to FIG. 5 which depicts a flowchart of a method 500 for controlling self-heating in an optical ring resonator, according to non-limiting implementations. In order to assist in the explanation of method 500, it will be assumed that method 500 is performed using device 101, and specifically by controller 120, for example when controller 120 is implementing application 126. Indeed, method 500 is one way in which device 101 and/or controller 120 can be configured. Furthermore, the following discussion of method 500 will lead to a further understanding of device 101 and its various components and/or controller 120. However, it is to be understood that device 101 and/or controller 120 and/or method 500 can be varied, and need not work exactly as discussed herein in conjunction with each other, and that such variations are within the scope of present implementations.

Regardless, it is to be emphasized, that method 500 need not be performed in the exact sequence as shown, unless otherwise indicated; and likewise various blocks may be performed in parallel rather than in sequence; hence the elements of method 500 are referred to herein as "blocks" rather than "steps". It is also to be understood, however, that method 500 can be implemented on variations of device 101 as well.

At block 501, controller 120 controls light source 144 to produce an optical signal at a power where self-heating shifts a resonance wavelength of the optical ring resonator 105 by at least 10 picometers, the self-heating comprising absorption in optical ring resonator 105 of optical power from a received optical signal.

At block 503, prior to at least one of modulating and filtering the optical signal at optical ring resonator 105, controller 120 controls heater 130 to sweep from a temperature higher than an operating temperature at which the resonance wavelength of optical ring resonator 105 is greater than a respective wavelength of the optical signal. For example, the input wavelength would be on the left-hand side of a minimum of the curves of FIG. 3. Indeed, such operation avoids areas of abrupt changes and/or the positive feedback region, in the transfer function due to self-heating that caused by the hysteresis when sweeping the ring temperature from a lower temperature to a higher temperature.

After controlling heater 130 the operating temperature at block 503, at block 505 controller 120 at least one of modulates and filters the optical signal on optical waveguide 103 by controlling voltage control device 132.

In some implementations, the heater raising the temperature of heater 130 above an operating temperature, and lowering the temperature back to an operating temperature can ensure that the resonance wavelength of optical ring resonator 105 is larger than a wavelength of an optical signal being modulated by optical ring resonator 105, assuming that the operating temperature is related to the resonance wavelength via a look-up table, and the like, stored in memory 122. For example, such a table can store operating temperatures of heater 130 that correspond to different wavelength of optical signal to be modulated. Such a table can be further derived heuristically by varying the resonance wavelength of optical ring resonator 105 and determining the resulting transfer function due to self-heating at different wavelengths. Indeed, a shifted resonance wavelength of optical ring resonator 105 due to the self-heating can be determined from one or more of: varying the power of the optical signal; varying the respective wavelength of the optical signal; varying the temperature of the optical ring resonator 105 using heater 130; and varying the voltage applied to optical ring resonator 105 using the voltage control device 132.

Either way, in present implementations, device 101 is operated to modulate and/or tune the optical signal of light source 144 in the presence of self-heating on the blue-side of a transfer function, below a resonance wavelength of optical ring resonator 105 and higher than wavelengths where the transfer function is relatively constant.

Figure 6:
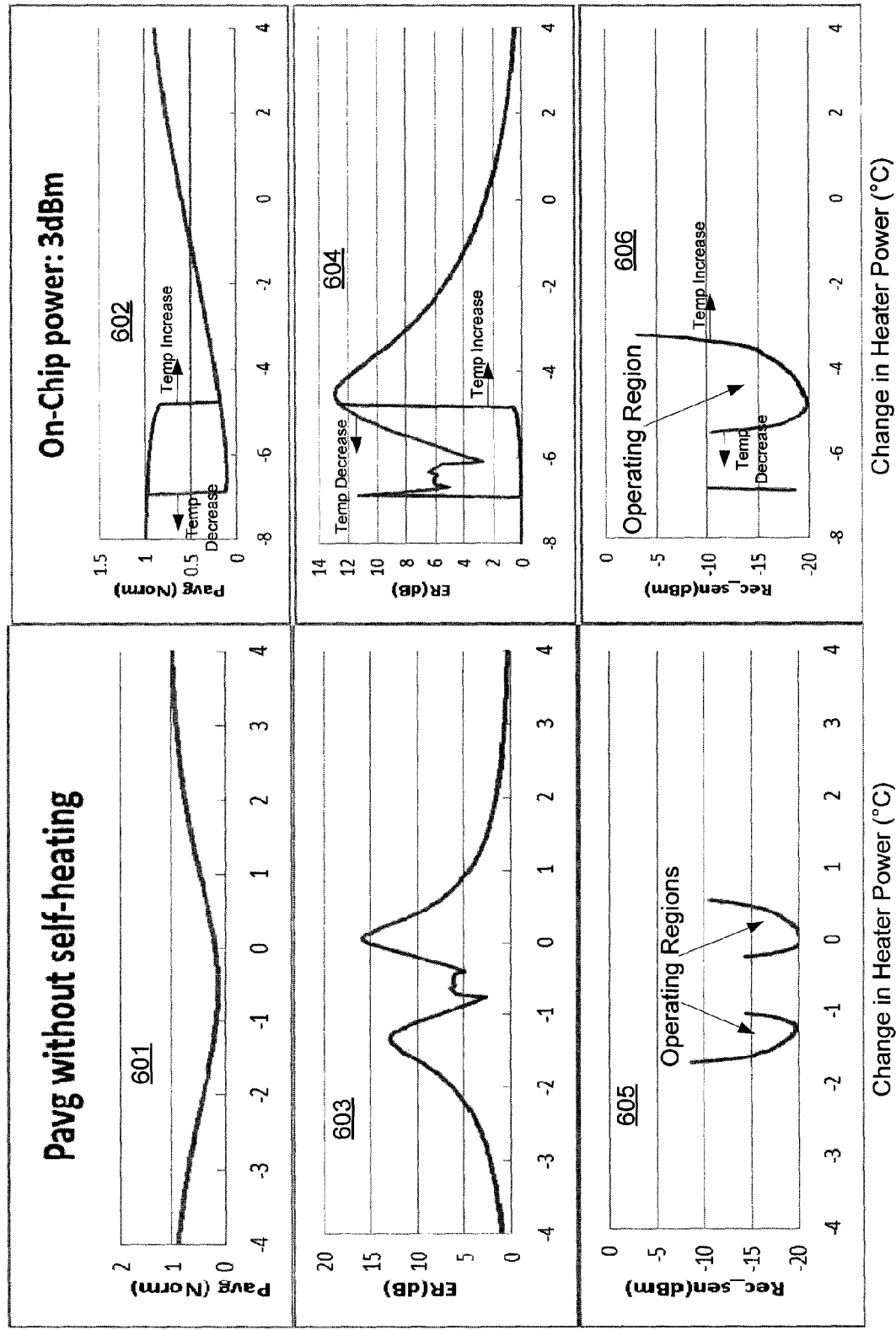
FIG. 6 depicts average power, extinction ratio and received sensitivity as a function of heater temperature for a ring resonator when no self-heating occurs and in the presence of 3 dBm self-heating, according to non-limiting implementations.

This is further demonstrated in FIG. 6 which depicts average power (graphs 601, 602), Pavg, extinction ratio (graphs 603, 604), ER, and an optical figure of merit, the Received Sensitivity (graphs 605, 606), Rec_sen, as a function of heater temperature delta (e.g. "0" on the x-axis represents a normalized heating power) for optical ring resonator 105 when no self-heating occurs (left-hand graphs) and when 3 dBm of self-heating occurs.

It is understood that lower heater temperatures correspond to longer (e.g. redder) wavelengths and lower frequencies, and higher heater temperatures correspond to shorter (e.g. bluer) wavelengths and higher frequencies. Hence, a left side of each graph in FIG. 6 represents a red-side (i.e. longer wavelengths, shorter frequencies) and a right side of each graph in FIG. 6 represents a blue-side (i.e. shorter wavelengths, higher frequencies).

When no self-heating occurs, as in graphs 601, 603, 605, average power is symmetric, as is the extinction ratio and the received sensitivity, about a given heater temperature (e.g. about 0.5 degrees lower than the "0" value) which corresponds to where the resonance wavelength of optical ring resonator 105 is about equal to the wavelength of the optical signal. The extinction ratio in graph 603 is unstable around the given heater temperature as abrupt changes occur in the transfer function then the resonance wavelength of optical ring resonator 105 is about equal to the wavelength of the optical signal. Furthermore, the received sensitivity in graph 605 shows narrow operating regions for optical ring resonator 105 about the region where the resonance wavelength of optical ring resonator 105 is about equal to the wavelength of the optical signal. In other words, when no self-heating occurs there are two operating regions for modulating and/or filtering the optical signal above and below a resonance wavelength of optical ring resonator 105, but each operating region is relatively narrow at least compared to an operating region where self-heating occurs as described hereafter.

In contrast, in each of graphs 602, 604, 606 behaviour of ring 105 is shown to be hysteric in the presence of self-heating, with the region of positive feedback (e.g. the discontinuities in each of graphs 602, 604) shifting depending on whether temperature is increasing or decreasing. Specifically, in the presence of self-heating, the average power in graph 602 has hysteresis in that when the heater temperature is decreased, the average power jumps abruptly due to self-heating when the resonance wavelength of optical ring resonator 105 is about equal to the wavelength of the optical signal. However, as the heater temperature is increased, the average power stays higher until the region where the resonance wavelength of optical ring resonator 105 is about equal to the wavelength of the optical signal is surpassed and self-heating abruptly falls off the further the temperature gets from this region.

Similarly, as the heater temperature increases in the extinction ratio curve in graph 604, the extinction ratio is unstable, as is the received sensitivity in graph 606, as the changes in the transfer function in this region are abrupt. As the heater temperature decreases, an area of stability of the extinction ratio in graph 604 widens, and furthermore the received sensitivity in graph 606 shows a wider operating region than with no self-heating and/or when the heater temperature increases. In other words, on contrast to the no-self-heating scenario, with self-heating there is one operating region, as seen in graph 606, for modulating and/or filtering the optical signal below a resonance wavelength of optical ring resonator 105, but the operating region is wider than either of the operating regions of graph 605 where no self-heating occurs, and further widens when the heater temperature is decreased.

Hence, in some present implementations, prior to operating optical ring resonator 105 as a modulator and/or filter, the temperature of heater 130 can be increased to be higher than an operating temperature and decreased to the operating temperature. The low extinction ration (e.g. about "0"), prior to the abrupt change, as the temperature changes from a low temperature to a higher temperature is due to the transfer functions being about aligned for each curve (e.g. in FIG. 3 the input wavelength is on the red-side where there is almost no difference in profiles 301, 302).

Attention is next directed to FIG. 7 which again depicts graphs 602, 604, 606 as well as graphs 702, 704, 706 which are respectively similar to graphs 602, 604, 606, but for self-heating of 4 dBm, i.e. higher self-heating than that depicted in graphs 602, 604, 606. Comparing the 4 dBm self-heating to the 3 dBm self-heating and specifically comparing graphs 702, 704, 706, respectively, with graphs 602, 604, 606, it is clear that the hysteresis effect due to self-heating increases from 3 dBm of self-heating to 4 dBm of self-heating. In other words, more heat is produced in 4 dBm self-heating and hence the hysteresis is wider and/or more pronounced.

However, comparing received sensitivity graphs 606, 706, the operating region is wider with 4 dBm of self-heating than with 3 dBm of self-heating. Hence, inducing self-heating can lead to wider operating regions.

Figure 7:
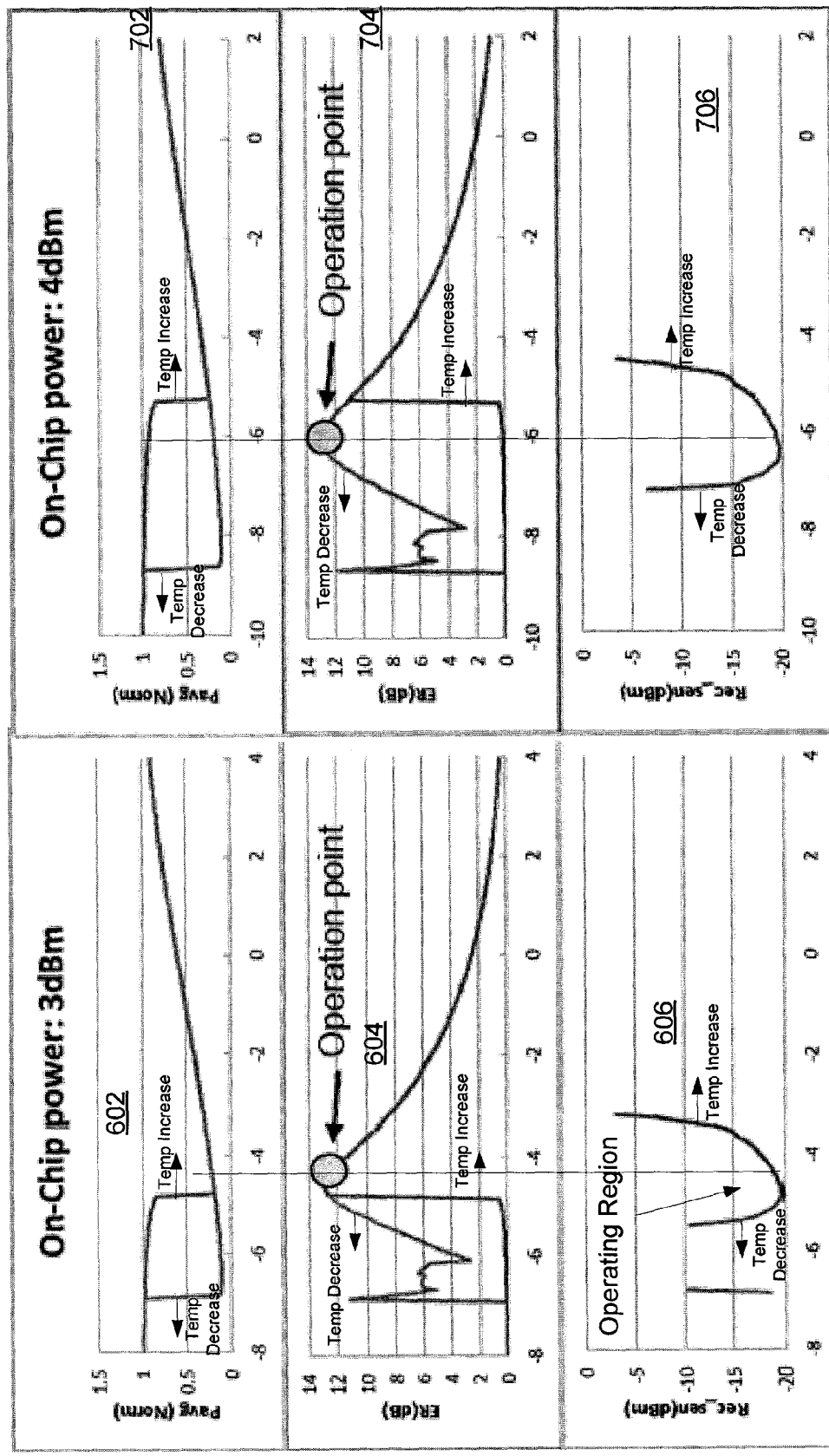
FIG. 7 depicts average power, extinction ratio and received sensitivity as a function of heater temperature for a ring resonator in the presence of 3 dBm input power with self-heating and in the presence of 4 dBm input power with self-heating, according to non-limiting implementations.

FIG. 7 also demonstrates that a degree of self-heating and/or operating conditions using self-heating can be determined by a targeted extinction ratio. For example, a desired operating extinction ratio is indicated in each of graphs 604, 704 in FIG. 7, which is at and/or adjacent to, a peak extinction ratio (e.g. labelled "Operation Point"). For the 4 dBm input power, in order to access the extinction ratio at the operation point, the heater temperature must be decreased from a temperature higher than an operating temperature to the operating temperature; when the heater temperature is increased, the desired operating extinction ratio will not be achievable due to hysteresis. However, for the 3 Bm input power, the operating point can be achieved regardless of whether the temperature is increased or decreased.

However, for the 3 dBm input when the operating temperature is reached by increasing the heater temperature, the operating point is still close to the instability point (i.e. the region of negative feedback is narrower than when the heater temperature is decreased); thus, if external conditions change, there can be a chance that instability in operation of ring 105 can occur. Hence, reaching the operating temperature by decreasing the temperature can be desirable to take advantage of the widened negative feedback region.

Hence, operation of ring 105 is generally controlled to maximize a negative feedback region such that a desired operating extinction ratio is accessible regardless of hysteresis in the presence of self-heating.

In any event, as seen for the higher self-heating curves in FIG. 4, eventually self-heating will cause the transfer functions to have relatively shallow curves on the blue-side due to hysteresis; furthermore the operating region, as defined by the received sensitivity, will become small and/or non-existent. Hence, operating optical ring resonator 105 with self-heating can be limited to regions where shifts in the resonance wavelength of optical ring resonator 105 due to the self-heating is in range of about 10 picometers to below where a desired operation extinction ratio is not accessible due to hysteresis, and using a temperature sweep in both directions. In other words, a level self-heating is selected where a shift in the resonance wavelength of optical ring resonator 105 due to the self-heating is in a range where a given level of resonance of the optical ring resonator is both accessible and independent of optical ring temperature adjustment direction, for example as determined from the extinction ratio, and/or heuristic sweeping of heater temperature of ring 105 using a given input wavelength, and determining a region of negative feedback.

In particular, in some implementations, at a given level of self-heating a peak in an extinction ratio of optical ring resonator 105 as a function of heater temperature is outside of a hysteresis region, and controller 120 can be further configured to control heater 130 to the operating temperature from either a high-to-low temperature adjustment direction or a low-to-high temperature adjustment direction, though a high-to-low temperature adjustment direction can be preferred to minimize instability due to fluctuation of external conditions. Alternatively, at a given level of self-heating a peak in an extinction ratio of optical ring resonator 105 as a function of heater temperature is inside a hysteresis region, and controller 120 can be further configured to control the heater to the operating temperature by sweeping from a temperature higher than the operating temperature to the operating temperature.

Indeed, an upper limit to the self-heating can depend on the wavelength of the optical signal to be modulated and/or filtered, as well as the physical and materials properties of optical ring resonator 105. For example, while present implementations are described with reference to optical ring resonator 105 being made from silicon, optical ring resonator 105 can be made with other materials that have self-heating, but where self-heating properties differ from those of silicon.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of computing device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., radio-frequency (RF), microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:
1. A device comprising:
a light source configured to produce an optical signal;
an optical waveguide configured to receive and convey the optical signal from the light source;
an optical ring resonator coupled to the optical waveguide, the optical ring resonator configured to: receive the optical signal from the optical waveguide; and, at least one of modulate and filter the optical signal on the optical waveguide;
a heater positioned to heat the optical ring resonator;
a voltage control device positioned to change a voltage across the optical ring resonator; and,
a controller in communication with the light source, the heater and the voltage control device, the controller configured to:

control the light source to produce the optical signal at a power where self-heating shifts a resonance wavelength of the optical ring resonator by at least 10 picometers, the self-heating comprising absorption in the optical ring resonator of optical power from a received optical signal; and, prior to at least one of modulating and filtering the optical signal at the optical ring resonator, control the heater to an operating temperature at which the resonance wavelength of the optical ring resonator is greater than a respective wavelength of the optical signal, wherein at a given level of self-heating a peak in an extinction ratio of the optical ring resonator as a function of heater temperature is outside of a hysteresis region, and the controller is further configured to control the heater to the operating temperature from either a high-to-low temperature adjustment direction or a low-to-high temperature adjustment direction.

2. The device of claim 1, wherein, at the operating temperature, the respective wavelength of the optical signal is on a blue edge of a resonance curve of the optical ring resonator.

3. The device of claim 1, wherein a shift in the resonance wavelength of the optical ring resonator due to the self-heating is in a range where a given level of resonance of the optical ring resonator is both accessible and independent of optical ring temperature adjustment direction.

4. The device of claim 1, wherein the controller is further configured to control the heater to the operating temperature by sweeping from a temperature higher than the operating temperature to the operating temperature.

5. The device of claim 1, wherein a shifted resonance wavelength of the optical ring resonator due to the self-heating is determined from one or more of: varying the power of the optical signal; varying the respective wavelength of the optical signal; varying the temperature of the optical ring resonator using the heater; and varying the voltage applied to the optical ring resonator using the voltage control device.

6. The device of claim 1, wherein the light source comprises one or more of a laser and a coherent light source.

7. The device of claim 1, wherein the optical waveguide and the optical ring resonator are formed from one or more of a photonic integrated circuit and a silicon photonic integrated circuit.

8. The device of claim 1, wherein the controller is further configured to at least one of modulate and filter the optical signal on the optical waveguide after controlling the heater to the operating temperature.

9. A method comprising: controlling, using a controller, a light source to produce an optical signal at a power where self-heating shifts a resonance wavelength of an optical ring resonator by at least 10 picometers, the self-heating comprising absorption in the optical ring resonator of optical power from a received optical signal, the controller, the light source and the optical ring resonator being components of a device comprising: the light source configured to produce the optical signal; an optical waveguide configured to receive and convey the optical signal from the light source; the optical ring resonator coupled to the optical waveguide, the optical ring resonator configured to: receive the optical signal from the optical waveguide; and, at least one of modulate and filter the optical signal on the optical waveguide; a heater positioned to heat the optical ring resonator; a voltage control device positioned to change a voltage across the optical ring resonator; and, the controller in communication with the light source, the heater and the voltage control device; and, prior to at least one of modulating and filtering the optical signal at the optical ring resonator, controlling, using the controller, the heater to an operating temperature at which the resonance wavelength of the optical ring resonator is greater than a respective wavelength of the optical signal, wherein at a given level of self-heating a peak in an extinction ration of the optical ring resonator as a function of heater temperature is outside a hysteresis region, and the controlling using the controller, the heater to the operating temperature is from either a high-to-low temperature adjustment direction or a low-to-high temperature adjustment direction.

10. The method of claim 9, wherein, at the operating temperature, the respective wavelength of the optical signal is on a blue edge of a resonance curve of the optical ring resonator.

11. The method of claim 9, wherein a shift in the resonance wavelength of the optical ring resonator due to the self-heating is in a range where a given level of resonance of the optical ring resonator is both accessible and independent of optical ring temperature adjustment direction.

12. The method of claim 9, further comprising controlling, using the controller, the heater to the operating temperature by sweeping from a temperature higher than the operating temperature to the operating temperature.

13. The method of claim 9, wherein a shifted resonance wavelength of the optical ring resonator due to the self-heating is determined from one or more of:
varying the power of the optical signal; varying the respective wavelength of the optical signal; varying the temperature of the optical ring resonator using the heater; and varying the voltage applied to the optical ring resonator using the voltage control device.

14. The method of claim 9, wherein the light source comprises one or more of a laser and a coherent light source, and the optical waveguide and the optical ring resonator are formed from one or more of a photonic integrated circuit and a silicon photonic integrated circuit.

15. The method of claim 9, further comprising at least one of: modulating and filtering the optical signal on the optical waveguide after controlling the heater to the operating temperature.

16. A non-transitory computer-readable medium storing a computer program, wherein execution of the computer program is for: controlling, using a controller, a light source to produce an optical signal at a power where self-heating shifts a resonance wavelength of an optical ring resonator by at least 10 picometers, the self-heating comprising absorption in the optical ring resonator of optical power from a received optical signal, the controller, the light source and the optical ring resonator being components of a device comprising: the light source configured to produce the optical signal; an optical waveguide configured to receive and convey the optical signal from the light source; the optical ring resonator coupled to the optical waveguide, the optical ring resonator configured to: receive the optical signal from the optical waveguide; and, at least one of modulate and filter the optical signal on the optical waveguide; a heater positioned to heat the optical ring resonator; a voltage control device positioned to change a voltage across the optical ring resonator; and, the controller in communication with the light source, the heater and the voltage control device; and, prior to at least one of modulating and filtering the optical signal at the optical ring resonator, controlling, using the controller, the heater to an operating temperature at which the resonance wavelength of the optical ring resonator is greater than a respective wavelength of the optical signal, wherein at a given level of self-heating a peak in an extinction ration of the optical ring resonator as a function of heater temperature is outside a hysteresis region, and the controlling using the controller, the heater to the operating temperature is from either a high-to-low temperature adjustment direction or a low-to-high temperature adjustment direction.

* * * * *